(12) United States Patent
McNamara

(10) Patent No.: US 10,540,861 B2
(45) Date of Patent: Jan. 21, 2020

(54) SUSTAINED AUTHENTICATION OF A CUSTOMER IN A PHYSICAL ENVIRONMENT

(75) Inventor: Michael R. McNamara, Edinburgh (GB)

(73) Assignee: NCR Corporation, Atlanta, GA (US)

( * ) Notice: Subject to any disclaimer, the term of this patent is extended or adjusted under 35 U.S.C. 154(b) by 2198 days.

(21) Appl. No.: 12/004,350

(22) Filed: Dec. 20, 2007

(65) Prior Publication Data

US 2009/0165092 A1 Jun. 25, 2009

(51) Int. Cl.
- G07F 19/00 (2006.01)
- G06Q 20/32 (2012.01)
- G06Q 20/42 (2012.01)

(52) U.S. Cl.
CPC .................. G07F 19/207 (2013.01)

(58) Field of Classification Search
CPC .............................. G06Q 20/00; G07F 19/207
USPC .......................................................... 705/64
See application file for complete search history.

(56) References Cited

U.S. PATENT DOCUMENTS

| | | | | |
|---|---|---|---|---|
| 4,420,751 A * | 12/1983 | Paganini et al. | | 705/43 |
| 4,991,008 A * | 2/1991 | Nama | | 348/150 |
| 5,216,502 A * | 6/1993 | Katz | | 348/150 |
| 5,544,321 A * | 8/1996 | Theimer et al. | | 709/226 |
| 5,892,824 A * | 4/1999 | Beatson et al. | | 713/186 |
| 6,123,259 A * | 9/2000 | Ogasawara | | 235/380 |
| 6,230,928 B1 * | 5/2001 | Hanna et al. | | 221/13 |
| 6,236,736 B1 * | 5/2001 | Crabtree et al. | | 382/103 |
| 6,334,110 B1 * | 12/2001 | Walter et al. | | 705/14.41 |
| 6,343,739 B1 * | 2/2002 | Lippert | | 235/383 |
| 6,484,936 B1 * | 11/2002 | Nicoll et al. | | 235/379 |
| 6,583,813 B1 * | 6/2003 | Enright et al. | | 348/150 |
| 6,598,025 B1 * | 7/2003 | Hamilton et al. | | 705/22 |
| 6,704,716 B1 * | 3/2004 | Force | | 705/80 |
| 6,726,094 B1 * | 4/2004 | Rantze et al. | | 235/379 |

(Continued)

OTHER PUBLICATIONS

"Facility." Webster's Third New International Dictionary, Unabridged, 1993. [online][retrieved on Feb. 10, 2011]. Retrieved from: <http://lionreference.chadwyck.com/searchFulltext.do?id=12170129&idType=offset&divLevel=2&queryId=../session/1297386863_1416&area=mwd&forward=refshelf&trail=refshelf>.*

(Continued)

*Primary Examiner* — James M Detweiler
*Assistant Examiner* — Monica A Mandel
(74) *Attorney, Agent, or Firm* — Schwegman, Lundberg & Woessner

(57) ABSTRACT

A system for use in allowing a user to conduct one or more transactions at one or more touchpoints in a business facility includes an authentication component, a tracking component, and a control component. The authentication component is configured to authenticate the user as a person allowed to conduct the one or more transactions. The tracking component is configured to track the user's location within the facility as the user moves through the facility. The control component is configured (a) to receive authentication information from the authentication component, (b) to receive location information from the tracking component, (c) to use the location information to recognize that the user has moved into position to engage one of the touchpoints, and (d) to deliver a message to the touchpoint authorizing the touchpoint to engage in one or more transactions with the user.

4 Claims, 5 Drawing Sheets

(56) References Cited

U.S. PATENT DOCUMENTS

| | | | |
|---|---|---|---|
| 6,761,308 B1* | 7/2004 | Hanna et al. | 235/379 |
| 6,783,459 B2* | 8/2004 | Cumbers | 463/29 |
| 6,920,435 B2* | 7/2005 | Hoffman et al. | 705/44 |
| 6,925,565 B2* | 8/2005 | Black | 713/186 |
| 6,931,254 B1* | 8/2005 | Egner et al. | 455/456.3 |
| 6,937,998 B1* | 8/2005 | Swartz et al. | 705/27.1 |
| 7,003,497 B2* | 2/2006 | Maes | 705/64 |
| 7,015,945 B1* | 3/2006 | Sullivan | 348/150 |
| 7,084,765 B2* | 8/2006 | Clapper | 340/572.1 |
| 7,108,177 B2* | 9/2006 | Brookner | 235/382 |
| 7,187,998 B2* | 3/2007 | Okamoto et al. | 700/245 |
| 7,187,999 B2* | 3/2007 | Okamoto et al. | 700/245 |
| 7,191,035 B2* | 3/2007 | Okamoto et al. | 700/245 |
| 7,200,394 B2* | 4/2007 | Aoki et al. | 455/435.1 |
| 7,206,668 B2* | 4/2007 | Okamoto et al. | 700/245 |
| 7,209,803 B2* | 4/2007 | Okamoto et al. | 700/245 |
| 7,287,693 B2* | 10/2007 | Brookner | 235/382 |
| 7,293,711 B2* | 11/2007 | Brock | 235/462.01 |
| 7,304,662 B1* | 12/2007 | Sullivan et al. | 348/150 |
| 7,319,479 B1* | 1/2008 | Crabtree et al. | 348/169 |
| 7,357,717 B1* | 4/2008 | Cumbers | 463/29 |
| 7,418,474 B2* | 8/2008 | Schwab | 709/203 |
| 7,516,888 B1* | 4/2009 | Kundu et al. | 235/383 |
| 7,584,885 B1* | 9/2009 | Douglass | 235/379 |
| 7,602,382 B2* | 10/2009 | Hinckley et al. | 345/173 |
| 7,628,325 B2* | 12/2009 | McIntosh | 235/385 |
| 7,658,327 B2* | 2/2010 | Tuchman et al. | 235/381 |
| 7,726,557 B2* | 6/2010 | Bosch et al. | 235/379 |
| 7,734,513 B2* | 6/2010 | Bonner et al. | 705/26.9 |
| 7,751,971 B2* | 7/2010 | Chang et al. | 701/207 |
| 7,806,316 B1* | 10/2010 | Torres et al. | 235/379 |
| 7,941,534 B2* | 5/2011 | de la Huerga | 709/225 |
| 7,942,315 B2* | 5/2011 | He et al. | 235/379 |
| 8,036,152 B2* | 10/2011 | Brown et al. | 370/311 |
| 8,219,129 B2* | 7/2012 | Brown et al. | 455/502 |
| 8,340,672 B2* | 12/2012 | Brown et al. | 455/443 |
| 8,380,558 B1* | 2/2013 | Sharma et al. | 705/7.29 |
| 8,494,934 B2* | 7/2013 | Atkinson et al. | 705/35 |
| 8,558,663 B2* | 10/2013 | Newman et al. | 340/5.41 |
| 8,600,804 B2* | 12/2013 | Ramchandani | G06Q 30/02 705/14.23 |
| 2001/0011680 A1* | 8/2001 | Soltesz et al. | 235/379 |
| 2002/0122572 A1* | 9/2002 | Seal et al. | 382/117 |
| 2002/0132664 A1* | 9/2002 | Miller et al. | 463/29 |
| 2002/0178369 A1* | 11/2002 | Black | 713/186 |
| 2003/0018897 A1* | 1/2003 | Bellis et al. | 713/182 |
| 2003/0120957 A1* | 6/2003 | Pathiyal | 713/202 |
| 2003/0158937 A1* | 8/2003 | Johal et al. | 709/224 |
| 2003/0216969 A1* | 11/2003 | Bauer et al. | 705/22 |
| 2004/0015450 A1* | 1/2004 | Zingher et al. | 705/64 |
| 2004/0024709 A1* | 2/2004 | Yu et al. | 705/43 |
| 2004/0056100 A1* | 3/2004 | He | 235/470 |
| 2004/0093281 A1* | 5/2004 | Silverstein et al. | 705/26 |
| 2005/0071671 A1* | 3/2005 | Karaoguz | 713/200 |
| 2005/0091338 A1* | 4/2005 | de la Huerga | 709/217 |
| 2005/0177522 A1* | 8/2005 | Williams | 705/72 |
| 2005/0177859 A1* | 8/2005 | Valentino et al. | 725/105 |
| 2005/0259797 A1* | 11/2005 | Swartz et al. | 379/93.12 |
| 2005/0269405 A1* | 12/2005 | Throckmorton et al. | 235/383 |
| 2006/0040679 A1* | 2/2006 | Shikano et al. | 455/457 |
| 2006/0097045 A1* | 5/2006 | Tsutsui et al. | 235/383 |
| 2006/0111811 A1* | 5/2006 | Okamoto et al. | 700/214 |
| 2006/0111812 A1* | 5/2006 | Okamoto et al. | 700/214 |
| 2006/0112034 A1* | 5/2006 | Okamoto et al. | 706/16 |
| 2006/0116973 A1* | 6/2006 | Okamoto et al. | 706/16 |
| 2006/0169771 A1* | 8/2006 | Brookner | 235/382 |
| 2006/0184279 A1* | 8/2006 | Okamoto et al. | 700/245 |
| 2006/0251255 A1* | 11/2006 | Batta | 380/270 |
| 2007/0023508 A1* | 2/2007 | Brookner | 235/382 |
| 2007/0055785 A1* | 3/2007 | Stevens | 709/229 |
| 2007/0084913 A1* | 4/2007 | Weston | 235/380 |
| 2007/0138268 A1* | 6/2007 | Tuchman | 235/383 |
| 2007/0145121 A1* | 6/2007 | Dallal et al. | 235/380 |
| 2007/0174809 A1* | 7/2007 | Brown et al. | 717/100 |
| 2007/0200928 A1* | 8/2007 | O'Doherty et al. | 348/143 |
| 2007/0207750 A1* | 9/2007 | Brown et al. | 455/127.5 |
| 2008/0065897 A1* | 3/2008 | Jayaram et al. | 713/183 |
| 2008/0073431 A1* | 3/2008 | Davis | 235/383 |
| 2008/0074264 A1* | 3/2008 | Sharpe et al. | 340/572.1 |
| 2008/0074496 A1* | 3/2008 | Venetianer et al. | 348/150 |
| 2008/0076431 A1* | 3/2008 | Fletcher et al. | 455/440 |
| 2009/0057395 A1* | 3/2009 | He et al. | 235/379 |
| 2009/0105950 A1* | 4/2009 | Arteaga et al. | 701/213 |
| 2009/0294523 A1* | 12/2009 | Marano et al. | 235/380 |

OTHER PUBLICATIONS

Petrushin, V.A., Wei, G. & Gershman, A.V. Multiple-camera people localization in an indoor environement. Knowl Inf Syst (2006) 10: 229.[online] [Retrieved on Aug. 22, 2019], Retrieved from the Internet: <URL:https://doi.org/10.1007/s10115-006-0025-7> (Year: 2006).*

* cited by examiner

SUSTAINED AUTHENTICATION OF A CUSTOMER IN A PHYSICAL ENVIRONMENT

BACKGROUND

There are many business environments in which access to certain areas or certain information is restricted to people who have authorization for such access. The financial services industry, particularly in banking, is one area where such limited access is crucial. Access to financial records is typically restricted to the individuals or businesses to whom the records relate and to the authorized personnel of the institutions who maintain those records. Any person wishing to access a financial record must typically undergo an authentication procedure to prove that that person does, in fact, have authority to review the record.

In the banking industry, for example, a person wishing to access an account held at a banking institution through any one of multiple channels (e.g., at a physical branch, by telephone, or through the Internet) must successfully complete an authorization process before access will be granted. One common authorization technique in the banking industry is a card-and-PIN combination, in which a person wishing to conduct a transaction through a banking machine (e.g., an automated teller machine, or ATM) or with a human teller presents a bank card and enters a PIN (personal identification number) code. If the PIN code entered by the user matches the PIN code encrypted on the card, the authentication process is successful and the user is allowed to access the corresponding accounts and to conduct secure transactions involving those accounts.

Another common, and very simple, authentication technique used for transactions conducted in person at a physical branch is a visual inspection of a government-issued photo-identification document, such as a driver's license or passport. If the person presenting the document appears clearly to be the person depicted on the document, the person is granted access to secure information that is linked to that person or that document.

Certain business establishments allow users to engage in transactions at multiple locations, or touchpoints, within a facility. A banking establishment, for example, typically allows users to engage in business through self-service terminals, such as ATMs, and at full-service teller stations, where the users conduct transactions with the assistance of human tellers. In these establishments, the user must undergo authentication at each of the touchpoints, even when all of the touchpoints are contained within single physical establishment (e.g., a bank building) that is fully controlled by the business establishment. In a banking facility, for example, it is very common for a user to conduct a cash withdrawal through an ATM and then conduct some other transaction (e.g., a check deposit) with the help of a teller. In these situations, the user is typically required to undergo authentication once at the ATM (usually by card-and-PIN) and again at the teller station (usually by card-and-PIN or by photo-identification).

SUMMARY

A system for use in allowing a user to conduct one or more transactions at one or more touchpoints in a business facility includes an authentication component, a tracking component, and a control component. The authentication component is configured to authenticate the user as a person allowed to conduct the one or more transactions. The tracking component is configured to track the user's location within the facility as the user moves through the facility. The control component is configured (a) to receive authentication information from the authentication component, (b) to receive location information from the tracking component, (c) to use the location information to recognize that the user has moved into position to engage one of the touchpoints, and (d) to deliver a message to the touchpoint authorizing the touchpoint to engage in one or more transactions with the user.

In some systems, the control component is also configured to use the location information to recognize that the user has moved away from the touchpoint and to deliver a second message to the touchpoint indicating that the user has moved away. The control component is also configured in some systems to use the location information to recognize that the user has moved into position to engage a second one of the touchpoints and to deliver a message to the second touchpoint authorizing the second touchpoint to engage in one or more transactions with the user.

In some systems, the authentication component includes a terminal configured to authenticate the user when a code provided to the terminal by the user matches a code stored on a token carried by the user, such as a card that the user inserts into the terminal.

In some systems, the tracking component includes a visual-tracking system that includes one or more video cameras positioned within the facility. The tracking component is often configured to assess the user's location within a grid imposed on the facility, and the control component is configured to compare the user's location within the grid to one or more fixed grid locations associated with one or more of the touchpoints.

In some systems, the control component is configured to include information identifying the user or an image depicting the user in the message delivered to the touchpoint.

Other features and advantages will become apparent from the description and claims that follow.

DETAILED DESCRIPTION

Described below is a technique that allows the user of a physical business establishment, or facility, to conduct secure transactions at multiple touchpoints within the facility without undergoing a separate authentication process at each of the touchpoints. The technique allows the business entity that operates the facility to transfer the user's authentication from one touchpoint to another within the facility. One result is a business environment that is much more efficient and much less frustrating for both the business entity and the user. Tangible results include reduced wait times for users and greater transaction throughput within the business establishment.

Figure 1:
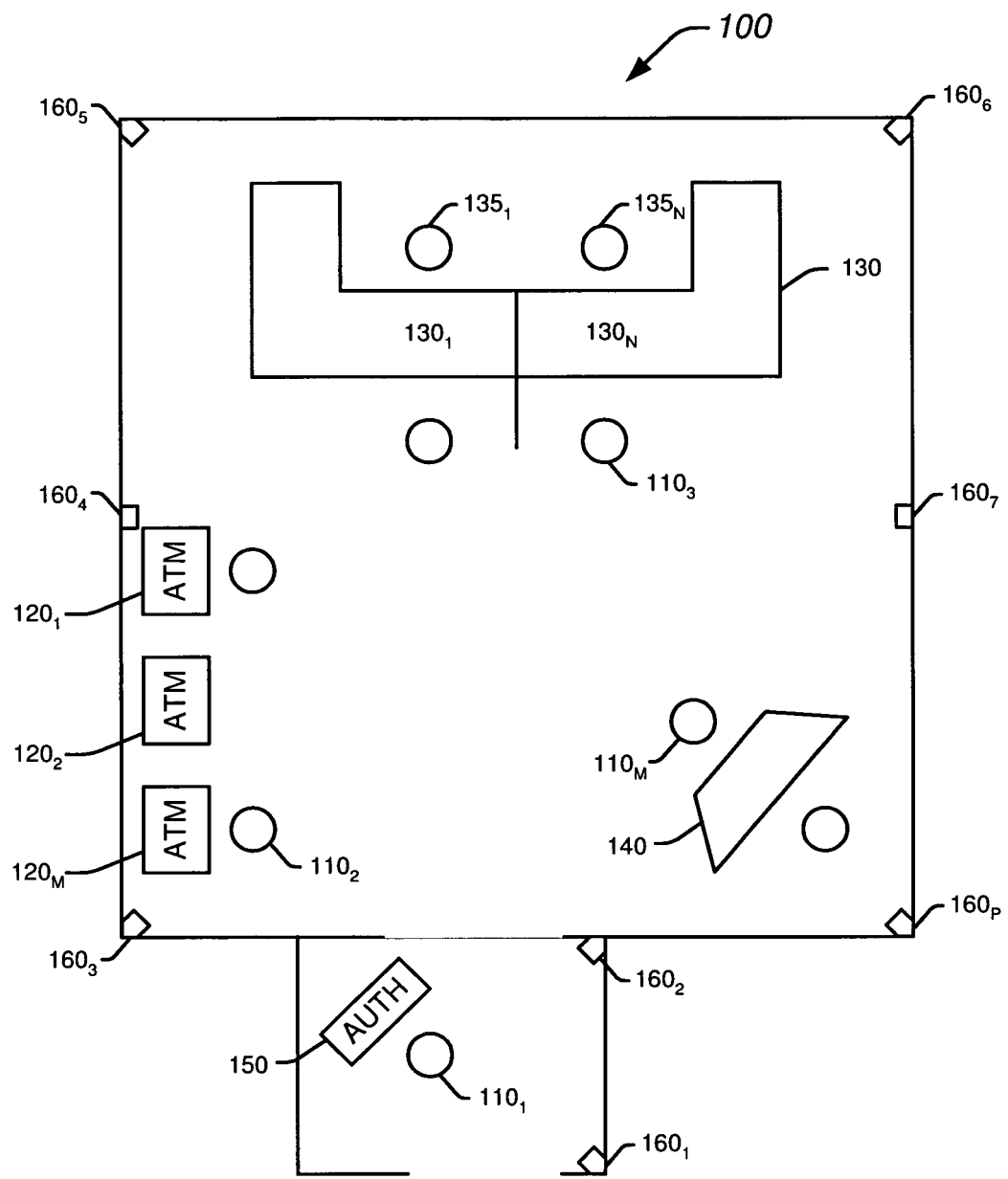
FIG. 1 is plan view of a facility 100 in which users of the facility are able to conduct secure transactions at multiple touchpoints.

FIG. 1 is plan view of a facility 100 in which users of the facility are able to conduct secure transactions at multiple touchpoints, each requiring authentication of the users, without undergoing an authentication process at each touchpoint. As an example, the facility 100 is described here in terms of a banking environment, such as a banking facility in which users $110_{1-M}$ are able to conduct transactions at three types of touchpoints—at a self-service station that includes one or more self-service terminals $120_{1-P}$, such as ATMs, at which bank users conduct secure transactions to completion without assistance from a bank representative; at a full-service station 130 that includes one or more teller terminals $130_{1-N}$ at which bank users conduct secure transactions with the assistance of bank representatives $135_{1-N}$; and at a specialty station 140, at which bank users engage in special transactions (e.g., taking loans) that require an even higher degree of service from bank representatives.

The facility 100 described here is equipped with a complex authentication-and-tracking system that allows each user to undergo authentication once and then passes the user's authentication from touchpoint to touchpoint as the user moves throughout the facility 100 and engages the various touchpoints. As a user $110_1$ enters the facility 100, the user engages an authentication terminal 150, at which the user undergoes the authentication process (e.g., by inserting a bankcard to the authentication terminal 150 and entering a PIN code that matches the code encrypted on the card). At the same time, cameras $160_{1-P}$ mounted throughout the facility 100 acquire images of the user that are used by a visual-tracking system to follow the user's movement through the facility at all times. Visual-tracking systems with these capabilities are known in the art and are not described in any detail here. One such system is developed by Accenture Technology Labs and is described at www.accenture.com/Global/Services/Accenture_Technology_Labs/R_and_I/VisualTracking.htm. Other components of the authentication-and-tracking system are described in detail below.

Figure 2:
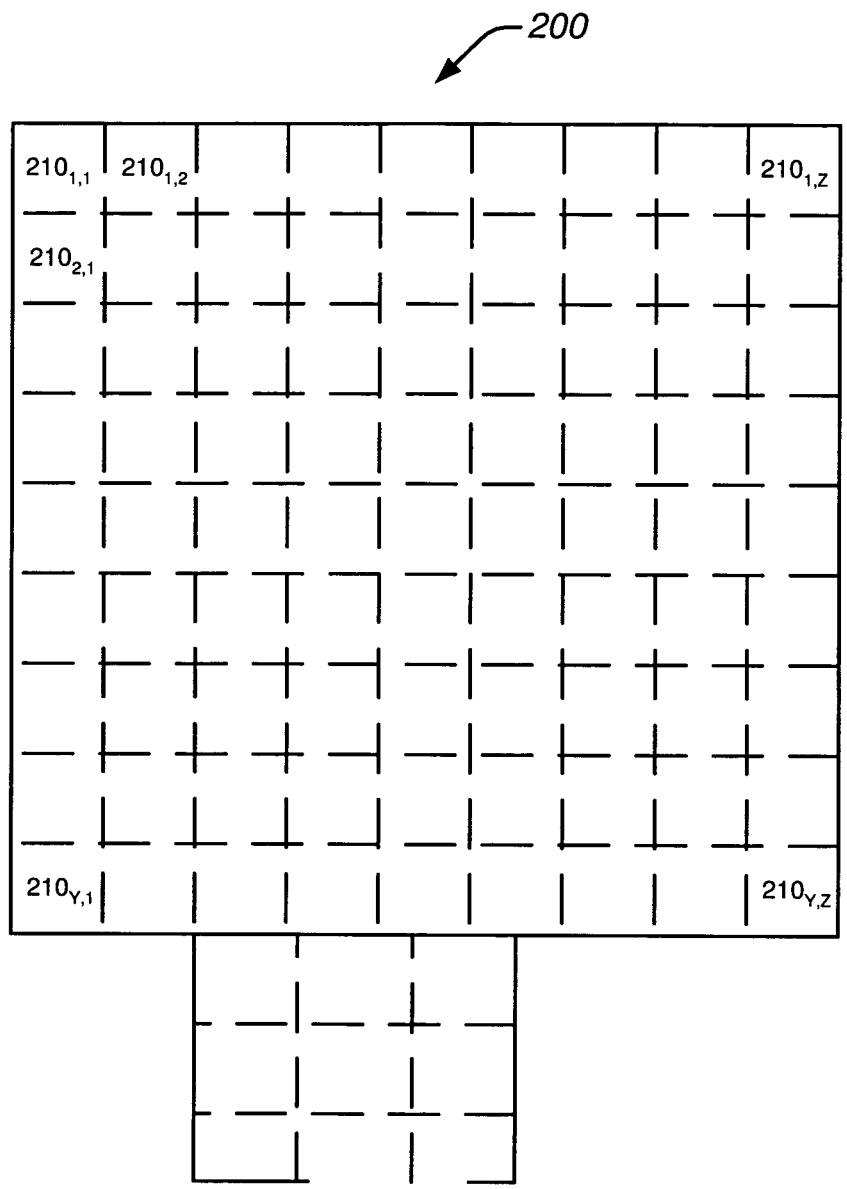
FIG. 2 shows the layout of a virtual grid imposed over the facility of FIG. 1.

FIG. 2 shows a virtual grid 200 that the authentication-and-tracking system lays over the facility 100. The grid 200 divides the facility 100 into a multitude of grid zones $210_{(1-Y,1-Z)}$ through which each of the users must move while within the facility 100. For each customer in the facility 100, the visual-tracking system is able to identify at all times which of the zones the user is standing in.

Figure 3:
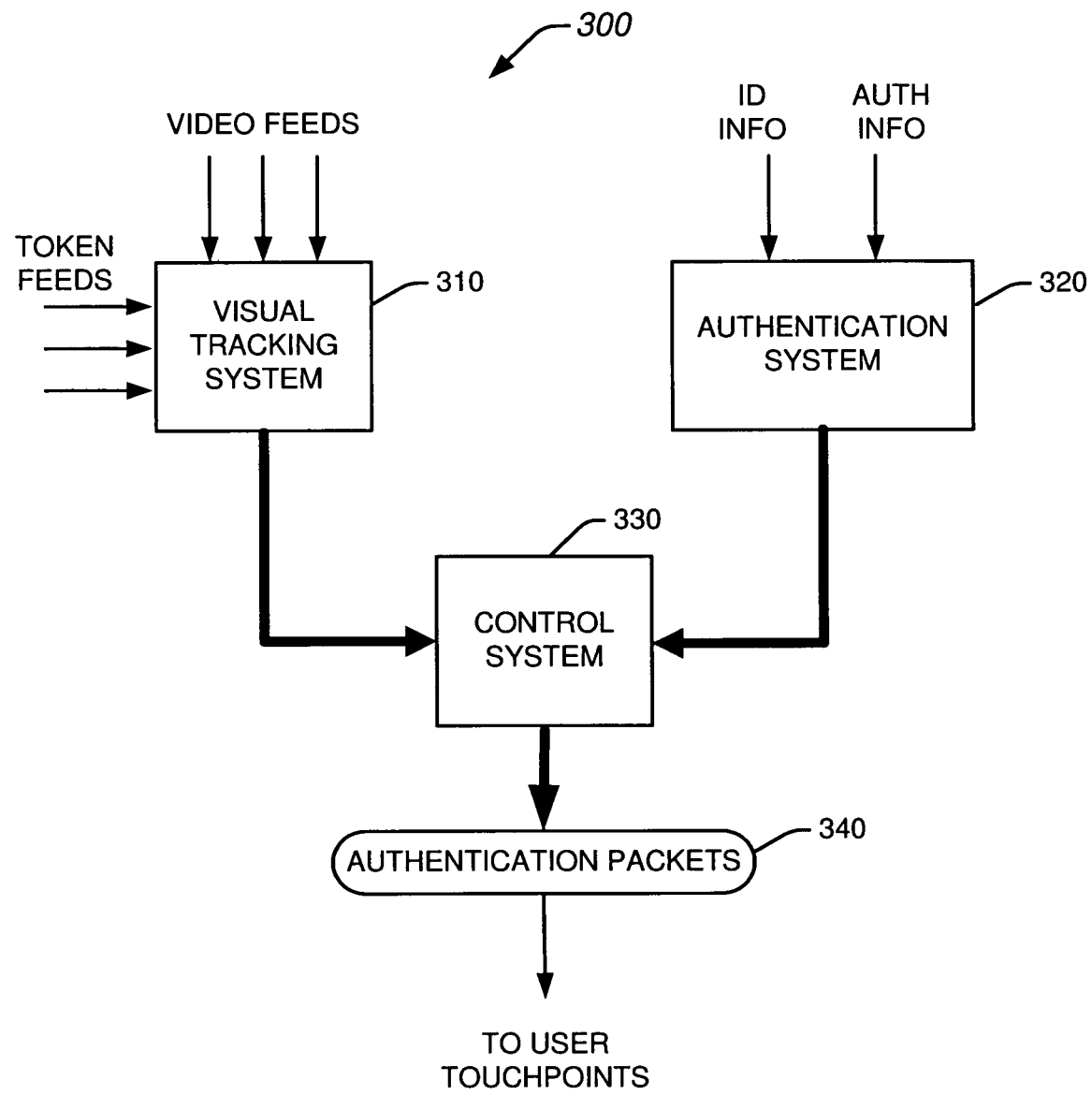
FIG. 3 shows various components of an authentication-and-tracking (A&T) system for use in the facility of FIG. 1.

FIG. 3 shows various components of the authentication-and-tracking (A&T) system 300. One of these components is the visual-tracking system 310 described above. The visual-tracking system 310 receives video feeds from the video cameras located throughout the facility and uses sophisticated image-tracking techniques to acquire and follow the image of each user as the user moves through the facility. Some visual-tracking systems, in addition to or instead of video images, use other location-identification tokens, such as radio-frequency (RF) tags carried by the users, to acquire and follow the users' positions throughout the facility. In these systems, the visual-tracking system 310 receives feeds from these tokens in addition to or instead of the video feeds from cameras. The visual-tracking system 310 applies the grid shown in FIG. 2 to create, for each user, real-time tracking information that indicates, by grid zone, the user's position within the facility at all times.

The A&T system 300 also includes an authentication system 320, which typically includes or works in conjunction with the authentication terminal described above. The authentication system 320 receives at least two pieces of information for each user—one identifying the user and one authenticating the user. With a card-and-PIN authentication technique, for example, the identification information might include data taken from the card identifying the person or accounts associated with the card and the PIN code encrypted on the card, and the authentication information might include the PIN code entered by the user into the authentication terminal.

A control system 330 receives data from both the visual-tracking system 310 and the authentication system 320 and uses this data to "attach" each user's authentication to that user's position in the facility as the user moves throughout the facility. The data that the control system 330 receives from the visual-tracking system 310 includes real-time positional data indicating the grid location of each object (or user) being tracked by the visual-tracking system. The data that the control system 330 receives from the authentication system 320 includes data identifying each user or identifying other important items, such as the accounts that an authenticated user is allowed to access. The control system 330 uses this information to create a series of real-time authentication packets 340 for users that it delivers to the various touchpoints within the facility as the users move through the facility and into positions to engage the touchpoints. The authentication packets 340 and their contents are described in more detail below.

Figure 4:
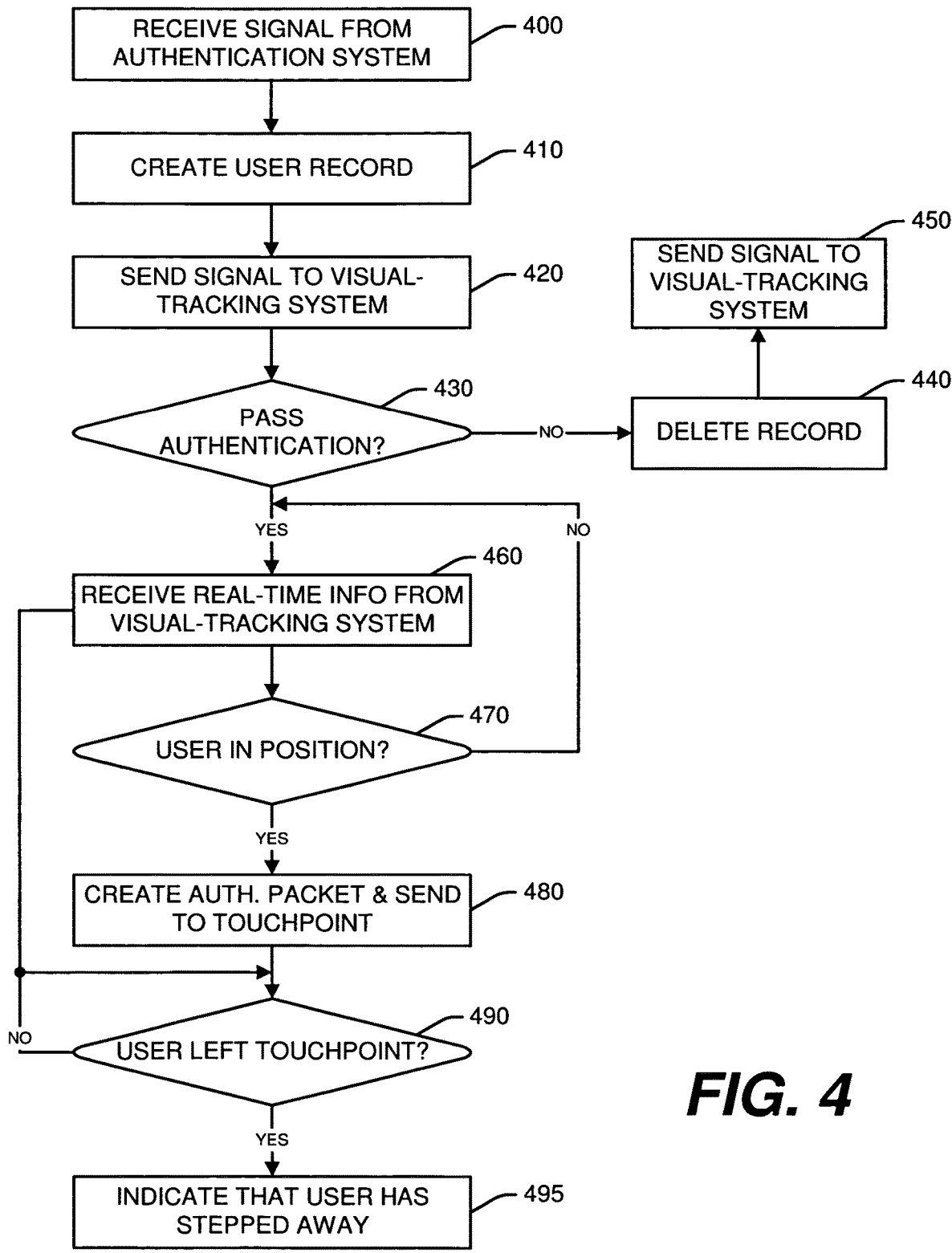
FIG. 4 is a flow diagram for operation of a control system in the A&T system of FIG. 3.

In general, as shown in FIG. 4, when a user enters the facility and engages the authentication terminal (FIG. 1), the control system 330 receives a signal from the authentication system 320 indicating that a new user has entered the facility (step 400). The control system 330 in turn creates a record in a user table (described below) corresponding to the new user (step 410) and delivers a signal to the visual-tracking system instructing it to acquire and begin tracking images of the user at a fixed grid location that is associated with the authentication terminal (step 420). The control system then waits (with respect to this user) for the authentication system to indicate whether the user passes the authentication process (step 430). If the user does not pass authentication, the control system deletes the corresponding user record from the table (step 440) and instructs the visual-tracking system to stop tracking the user (step 450). The user then enters the facility as an unauthenticated user.

When the authentication process succeeds in authenticating the user, the control system receives real-time positional data from the visual-tracking system indicating the position of the user in the facility (step 460). As it receives this data, the control system compares the user's position to fixed grid locations associated with each of the touchpoints in the facility to assess whether the user is in position to engage with any of the touchpoints (step 470). The control system continues this cycle until the user reaches a location that puts the user in position to engage one of the touchpoints. When that occurs, the control system creates an authentication packet and delivers the packet to the touchpoint nearest the user (step 480). The authentication packet, which is described in more detail below, notifies the touchpoint that an authenticated user is standing before it, identifies the user (or the accounts authorized for access by that user), and instructs the touchpoint to establish a session through which the authenticated user (and only that user) can conduct one or more secure transactions with the touchpoint.

In the meantime, the control system continues to monitor the user's position with respect to the fixed grid position associated with the touchpoint and to assess whether the user has moved away from that position (step 490). When the user moves away from the fixed grid position, the control system instructs the touchpoint to halt the session that it has established for the user (step 495). The behavior of both the touchpoint and the control system from this point depend on the business requirements of the establishment that operates them. Some establishments might create a short delay period during which the user can return to the fixed grid position and resume the session at the touchpoint. Other establishments might abort the user's session altogether and require establishment of a new session when the user returns to the touchpoint. Either way, the control system continues to monitor the user's position with respect to the various touchpoints in the facility and notifies a touchpoint when the user is in position to engage that touchpoint. The control system continues monitoring the movement of each user and notifying touchpoints in this manner until the user has exited the facility or the visual-tracking system has lost track of the user.

Figure 5:
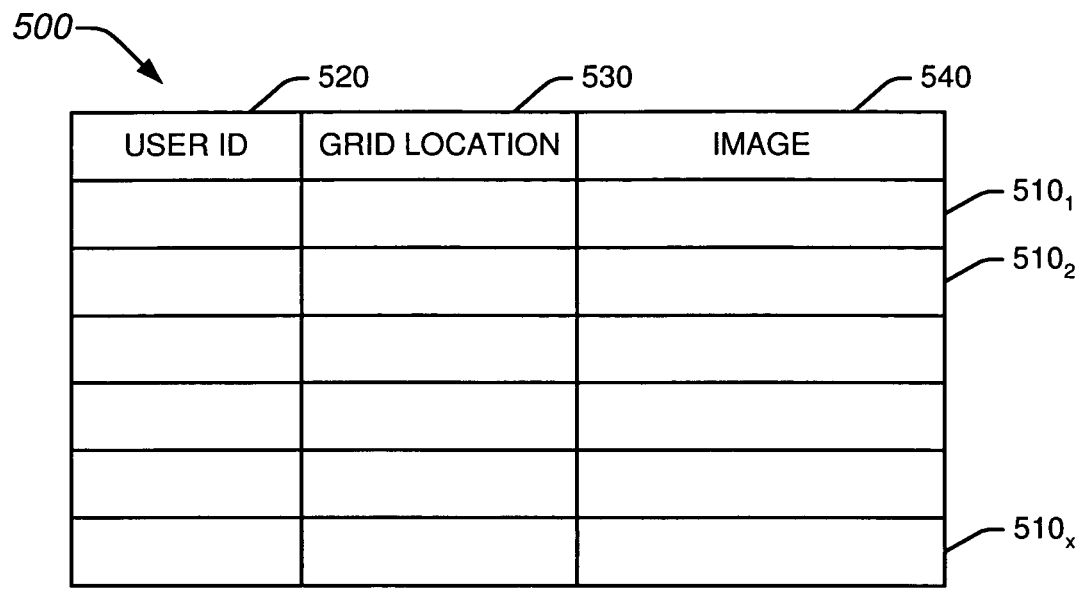
FIG. 5 shows a structure for a table of user records maintained by the control system of FIG. 4.

FIG. 5 shows the structure of a relational table 500 created by the control system to maintain a user record $510_{1-X}$ for each user in the facility. The table typically includes, at a minimum, a "user ID" entry 520 and a "grid location" entry 530 for each user. The "user id" entry identifies the user, and the "grid location" entry identifies the user's location within the facility. In some systems, each customer record also includes an "image" entry 540 that stores an image file (or a pointer to the storage location of an image file) that is created by the authentication system during the authentication process. Such an image file would be delivered, for example, to a touchpoint at which a human representative of the business establishment is available to verify that the user standing before the touchpoint is in fact the user for whom the touchpoint has received authentication information.

The control system updates the "grid location" entry in each user record $510_{1-X}$ in real-time as it receives positional data for the corresponding user from the visual-tracking system. When the control system receives an indication that the user has left the facility or that the visual-tracking system has lost track of the user, the control system deletes the corresponding user record $510_{1-X}$ from the table 500.

The control system uses the information stored in the table to create the authentication packets that it delivers to the various touchpoints in the facility. An authentication packet is typically created by taking a snapshot of the information contained in the user record that corresponds to the user who is in position to engage the touchpoint to which the packet is being sent.

Figure 6:
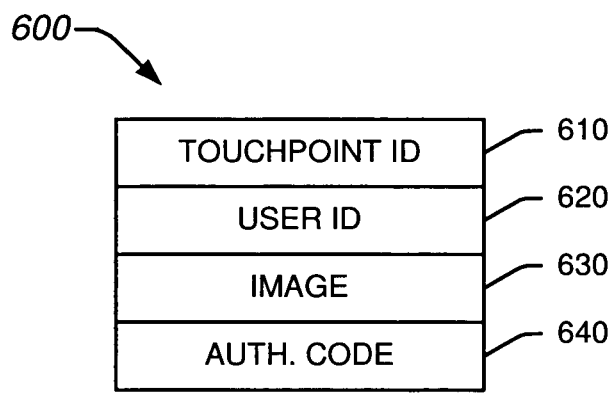
FIG. 6 shows a structure for an authentication packet created by the control system of FIG. 4.

FIG. 6 shows the structure of the authentication packet 600. The packet typically includes a "touchpoint ID" field 610 that identifies the touchpoint to which it is being delivered. The packet also includes a "user ID" field 620 that contains the user-identification information stored in the corresponding "user ID" entry of the relational table. If the table stores an image of the user, this image is embedded in an "image" field 630 for packets delivered to certain types of touchpoints (e.g., those operated by a human representative of the business establishment). In some establishments, the authentication packet 600 includes one or more additional fields containing other relevant information, such as an "authentication code" field 640 containing a unique authentication code for use by the touchpoint in connection with the session it will create for the user identified in the packet.

Computer-Based and Other Implementations

The various implementations of the invention claimed below are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, while the description above relies on examples taken from the banking industry, the invention is applicable in a wide range of other types of facilities, such as post offices, hospitals and medical offices. Many other embodiments are also within the scope of the following claims.

I claim:

1. A method of allowing a user to conduct multiple transaction sessions at multiple transaction terminals and a visual-camera-based user tracking system (tracking system) in a business facility without requiring user entry of authenticating information on more than one of the transaction terminals associated with the transaction sessions, wherein the tracking system includes a device and video cameras situated within the business facility, wherein each of the transaction terminals and the device includes a processor that executes instructions stored in a persistent storage medium, the instructions executed to perform the method, the method comprising:

detecting, at an initial transaction terminal, a card inserted by the user along with a Personal Identification Number (PIN) that is entered by the user after insertion of the card at the initial transaction terminal;

authenticating, by the initial transaction terminal, the user as an authenticated user based on the card and the PIN for a first transaction within a business facility;

sending, by the initial transaction terminal, an authentication record for the authenticated user to the tracking system;

performing, by the initial transaction terminal, the first transaction based on selections and input provided by the authenticated user;

tracking, by the tracking system, real-time visual data of the authenticated user while the authenticated user remains in the business facility;

determining, by the tracking system, from the real-time visual data that the authenticated user is at a second transaction terminal within the business facility;

sending, by the tracking system, a first message that includes an authentication packet to the second transaction terminal based on the authentication record maintained for the authenticated user;

receiving, by the second transaction terminal within the business facility, the first message containing the authentication packet from the tracking system recognizing, by the second transaction terminal, based on receipt of the first message that the authenticated user is located at the second transaction terminal for a second transaction within the business facility;

obtaining, by the second transaction terminal, an authentication code from the authentication packet;

beginning, by the second transaction terminal, a transaction session for the second transaction within the business facility using information in the authentication packet and the authentication code without requiring the authenticated user to provide any user identifying information to the second transaction terminal;

identifying, by the tracking system, movement of the authenticated user away from the second transaction terminal;

sending, by the tracking system, a second message to the second transaction terminal;

receiving, by second the transaction terminal, the second message from the tracking system as an indication that the authenticated user is no longer located at the second transaction terminal;

ending, by the second transaction terminal, the transaction session for the second transaction based on receipt of the second message; and sustaining, by the tracking system, authentication of the user for transacting at other transaction terminals through further first and second messages sent to the other transaction terminals while locations of the user are detected as being within the business facility.

2. The method of claim 1 wherein the authentication packet further includes an account number of the authenticated user.

3. The method of claim 1 wherein the authentication packet further includes an image of the authenticated user.

4. The method of claim 1 wherein the second transaction terminal comprises an automated teller machine.

* * * * *